US009695062B2

(12) United States Patent
Rajagopalan et al.

(10) Patent No.: US 9,695,062 B2
(45) Date of Patent: Jul. 4, 2017

(54) BIOCIDAL PURIFICATION DEVICE

(71) Applicant: Merck Patent GmbH, Darmstadt (DE)

(72) Inventors: Pascal Rajagopalan, Palaiseau (FR);
Julien Gross, Elancourt (FR); Ichiro Kano, Montigny le Bretonneux (FR);
Yves Gaignet, Montigny le Bretonneux (FR); Julien Bole, Montigny le Bretonneux (FR)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/270,529

(22) Filed: Sep. 20, 2016

(65) Prior Publication Data
US 2017/0029292 A1 Feb. 2, 2017

Related U.S. Application Data

(63) Continuation of application No. 14/889,603, filed as application No. PCT/EP2014/001096 on Apr. 24, 2014, now Pat. No. 9,475,708.

(30) Foreign Application Priority Data

May 22, 2013 (EP) .................... 13290114

(51) Int. Cl.
*C02F 1/32* (2006.01)
*C02F 103/02* (2006.01)

(52) U.S. Cl.
CPC ........ *C02F 1/325* (2013.01); *C02F 2103/026* (2013.01); *C02F 2201/326* (2013.01);
(Continued)

(58) Field of Classification Search
USPC ................ 250/455.11, 432 R; 210/660, 748
See application file for complete search history.

(56) References Cited

U.S. PATENT DOCUMENTS 6,579,495 B1 6/2003 Maiden
8,975,596 B1 * 3/2015 Matthews ............... C02F 1/325
250/432 R
(Continued)

FOREIGN PATENT DOCUMENTS

CN 101703356 A 5/2010
CN 201577956 U 9/2010
(Continued)

OTHER PUBLICATIONS

International Search Report mailed Jun. 4, 2014 in corresponding PCT application No. PCT/EP2014/001096.
(Continued)

*Primary Examiner* — Kiet T Nguyen
(74) *Attorney, Agent, or Firm* — Nields, Lemack & Frame, LLC

(57) ABSTRACT

A biocidal fluid purification cap (2) for a fluid container (1), preferably one storing purified water for use in laboratory environments and especially purified water for cell culture and water for molecular biology. The purification cap (2) includes a cap body (3) including an engagement feature (20) for removably attaching the cap body (3) to a mating engagement feature on a spout of the fluid container (1) to hermetically close a spout opening, at least one LED (7a) adapted to emit light in the UV-C range, electronic circuitry (15) for driving the LED(s) (7a), and a power supply for the electronic circuitry (15). The LED(s) (7a) is/are arranged in said cap body (3) so as to be separated from the environment by an UV-transparent window (6) provided in the cap body (3) such that light emitted from said LED(s) (7a) enters the opening of the spout when the cap (2) is attached to the spout of the container (1).

19 Claims, 3 Drawing Sheets

Figure 3:
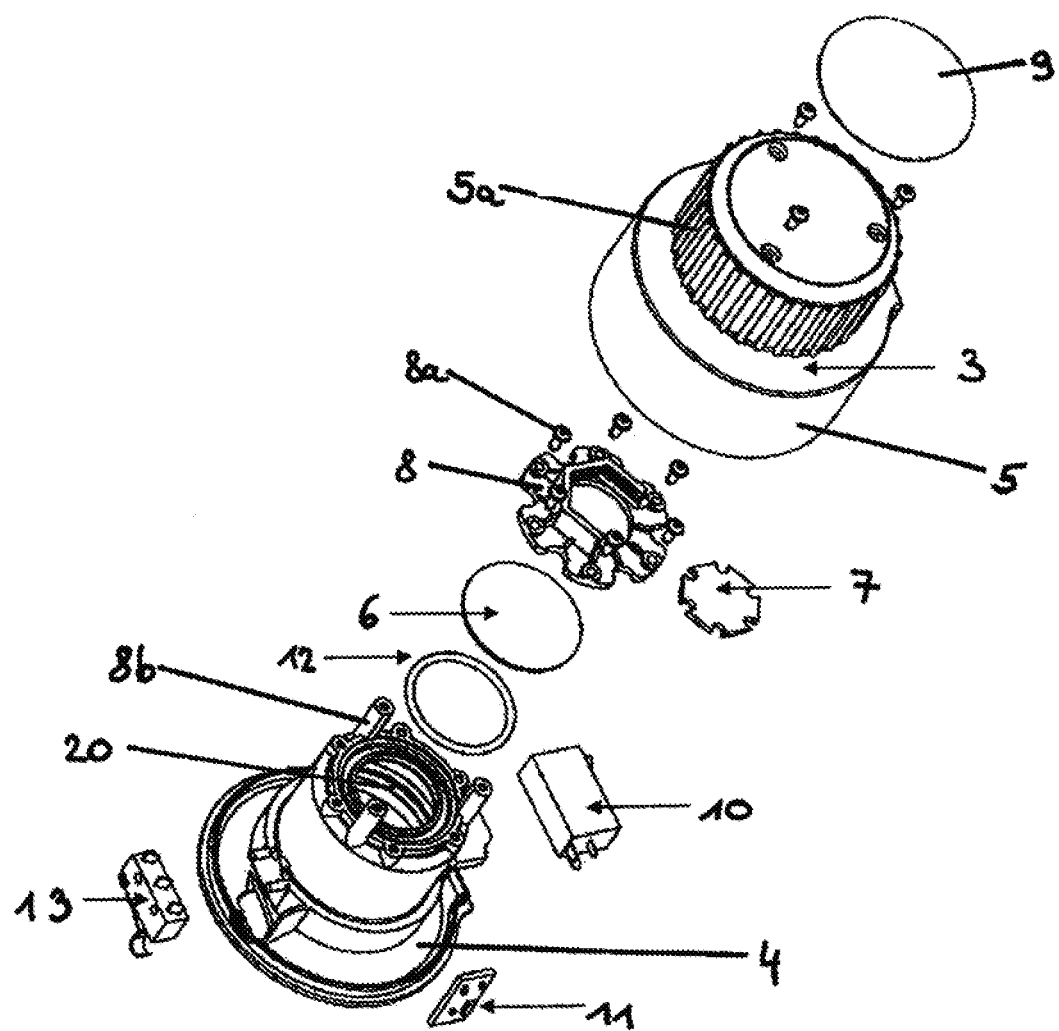

(52) U.S. Cl.
CPC ........... *C02F 2201/3221* (2013.01); *C02F 2201/3222* (2013.01); *C02F 2201/3228* (2013.01); *C02F 2209/005* (2013.01); *C02F 2303/04* (2013.01); *C02F 2307/02* (2013.01)

(56) References Cited

U.S. PATENT DOCUMENTS

| | | |
|---|---|---|
| 9,475,708 B2 | 10/2016 | Rajagopalan et al. |
| 2005/0258108 A1 | 11/2005 | Sanford |
| 2011/0114546 A1 | 5/2011 | Barsky et al. |
| 2011/0174993 A1* | 7/2011 | Blain .............. C02F 1/325 250/492.1 |
| 2012/0006995 A1 | 1/2012 | Greuel |
| 2013/0075312 A1 | 3/2013 | Ervin |
| 2015/0307368 A1 | 10/2015 | Yanke |
| 2016/0107904 A1 | 4/2016 | Rajagopalan et al. |

FOREIGN PATENT DOCUMENTS

| | | |
|---|---|---|
| CN | 102361823 A | 2/2012 |
| CN | 102755654 A | 10/2012 |
| CN | 202760846 U | 3/2013 |
| CN | 202760863 U | 3/2013 |
| JP | 2010-214241 A | 9/2010 |
| KR | 10-2013-0045884 A | 5/2013 |
| WO | 2010/104096 A1 | 9/2010 |

OTHER PUBLICATIONS

European communication dated Apr. 13, 2017 in corresponding European patent application No. 16202186.9.
Chinese communication, with English translation, dated Feb. 22, 2017 in corresponding Chinese patent application No. 201480029428.7.

* cited by examiner

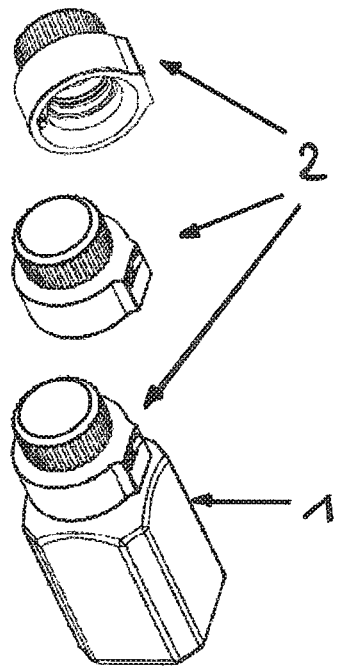
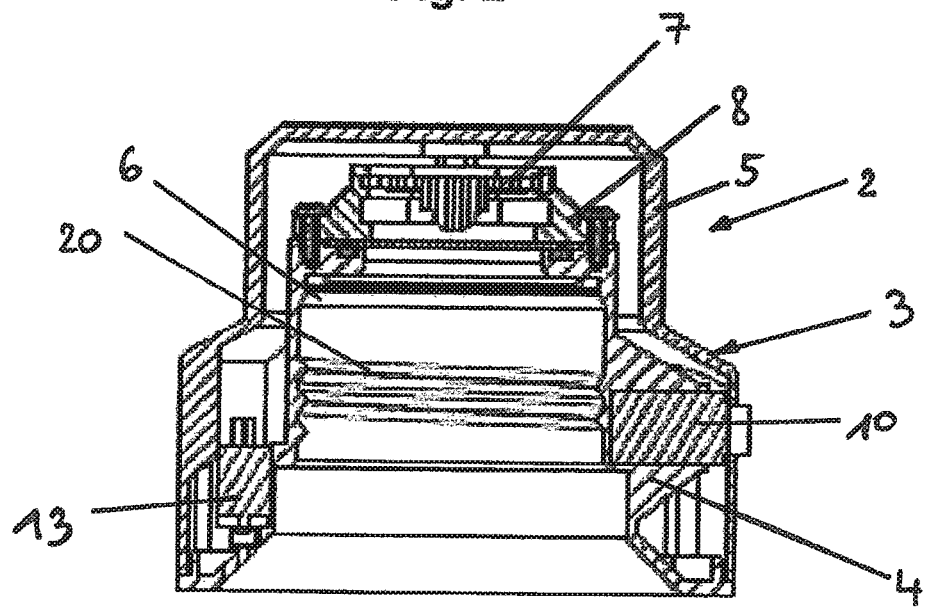

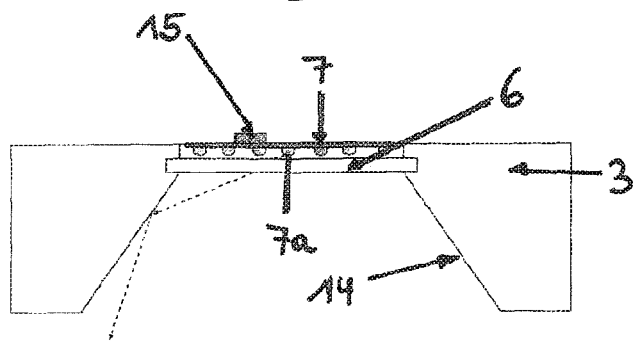
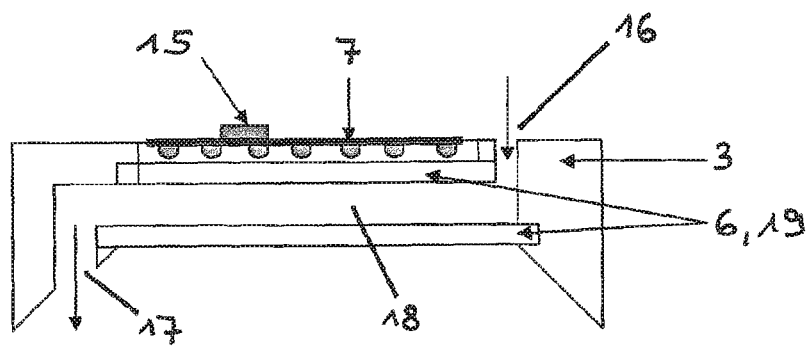
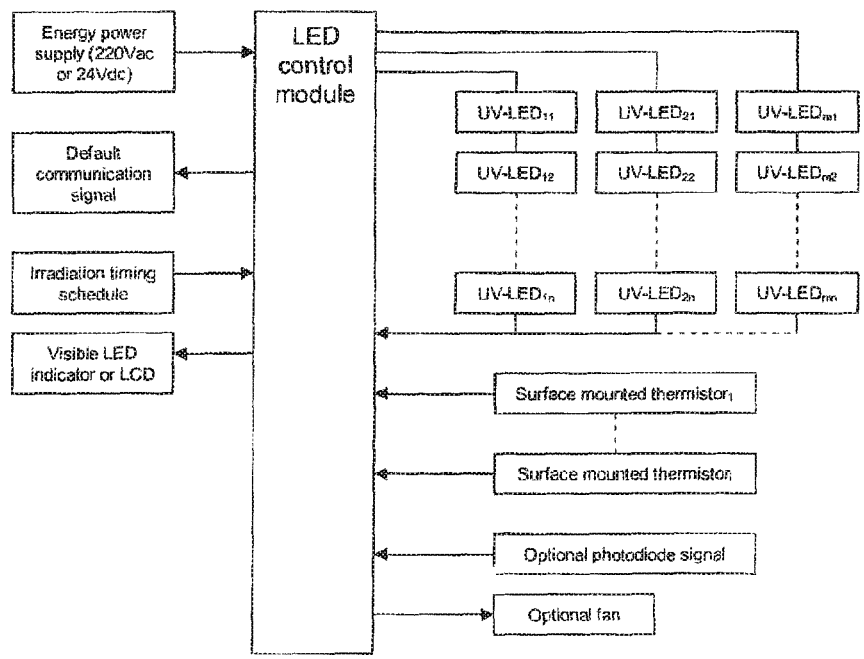

BIOCIDAL PURIFICATION DEVICE

This application is a continuation of U.S. patent application Ser. No. 14/889,603, filed Nov. 6, 2015, which is a 371 filing of PCT/EP2014/001096 filed Apr. 24, 2014, which claims priority of European Patent Application No. 13290114.1 filed May 22, 2013. The disclosure of U.S. patent application Ser. No. 14/889,603 is hereby incorporated by reference in its entirety.

The present invention relates to a biocidal fluid purification cap for a fluid container, preferably for a container intended to store purified water for the use in laboratory environments, i.e. water for cell culture or water for use in molecular biology, biochemistry or microbiology applications, but also purified water for use in the medical or health care field in general. The invention in this context specifically relates to static biocidal or bactericidal laboratory water purification devices based on a UV-LED light source.

Bottled or packaged purified water is subject to strict quality control tests and is delivered with a certificate of quality. The two types of water, for example water for cell culture and water for molecular biology, are intended for research use by scientists performing critical cell culture and molecular biology experiments. Both water types are sterile. Additionally, water for cell culture is cell-culture tested and free of pyrogens, mycoplasma, calcium and magnesium. Water for molecular biology is RT-PCR tested and is RNase-free, DNase-free, protease-free, calcium-free and magnesium-free. Following a purification process, the purified water is aseptically filled into sterile containers, e.g. PET-containers. These relatively small reservoirs or bottles, normally with a volume of less than 1 liter, are transported to the point of use in the laboratory experiments.

If the purified water is stored for longer periods of time or if only small amounts of water are taken out of a container, there is a risk of contamination of the remaining water because the water does not contain any chlorine or chemical sanitization agents. To solve this problem at present various counter measures are used. One is the disposing of once-opened bottles including all the unused water. Another is the freezing of once-opened bottles in a refrigerator. Further solutions are the use of mercury-based vapor lamps installed in a reservoir or inserted into a reservoir from the outside or the use of a recirculation pump through a mercury-based lamp reactor before the water is used.

The prior art devices using lamps containing mercury require a specific recycling procedure and extreme care and attention because mercury is a toxic element. Mercury pollution released into the environment is a serious threat. A particular risk exists if a lamp breaks during maintenance or operation. The manipulation of existing mercury lamps therefore involves additional safety constraints and measures. In addition, the existing mercury lamps produce considerable heat which will increase the water temperature. The higher water temperature is promoting microorganism growth and cause condensation of water vapor on the container wall which produces static droplets on the cooler areas of the container which are favoring biofilm development.

To solve part of the problems LED light sources have been proposed. One example is disclosed in U.S. Pat. No. 6,579,495 B1 in the form of a hand-held ultraviolet water purification system which includes an outwardly-extending pen-light sized configuration of solid state UV-light emitting diodes that emit ultraviolet light in the germicidal range. The system may include a battery and a timing circuit for operating the diodes. The application of the system due to its intended contact by immersion into the water imposes the risk of unintended contamination or complicated handling.

WO 2010/104096 A1 discloses another water purifier which comprises a water container with a spout and a water purifying part including an ultraviolet light-emitting diode located within the container so as to irradiate the ultraviolet light generated by the diode within a water passage of the container. This device, too, is disadvantageous in that the water-purifying part is completely immersed into the water within the container.

It is an object of the invention to provide an improved solution for preventing microorganism growth and maintain sterility in a fluid container, especially when the container has been opened once and especially for packaged water containers storing water for use in laboratory processes or in the medical or health care field.

To solve the problem, the present invention provides a biocidal fluid purification cap for a fluid container as defined in claim 1. Preferred embodiments are defined in the dependent claims.

The biocidal fluid purification cap for a fluid container according to the invention comprises a cap body including an engagement feature for removably attaching the cap body to a mating engagement feature on a spout of the fluid container to hermetically close a spout opening, at least one LED adapted to emit light in the UV-C range, electronic circuitry for driving the LED(s), and a power supply for the electronic circuitry, wherein said LED(s) is/are arranged in said cap body so as to be separated from the environment by an UV-transparent window provided in the cap body such that light emitted from said LED(s) enters the opening of the spout when the cap is attached to the spout of the container.

The purification cap of the invention is particularly advantageous in that it can be attached to and used in combination with common fluid containers used in the industry, for example, bottles, flasks, or bags, either rigid or semi-rigid, preferably with a volume of less than 2 liters for purified water serving as laboratory supply for cell culture and molecular biology, without requiring modification of the existing containers. For that purpose, the cap body includes the engagement feature for removably attaching the cap body to a mating engagement feature on the spout of such a fluid container. The one or more LED(s) is/are integrated into the cap body so as to be separated from the environment, which is typically the interior volume of the container when in use, by a UV-transparent window. The UV-transparent window shields the LED(s) and the circuitry for driving the LED(s) and integrating other control functions from water ingress so as to reduce potential contamination and damage and facilitate sterilization of the device. The window and arrangement of the LED(s) also shields the heat from the water, thereby reducing the risk of promoting the microorganism growth, including bacteria, virus and mycoplasma, during the use once the container closed by the cap has been opened. In view of the fact that the device of the invention corresponds to a cap in design and use, it is extremely easy to manipulate and handle.

None of the elements of the device are intended to be in contact with the water during use. Even in cases of accidental contact, for example by turning a container, the only parts getting contact with the water would be the UV-transparent window and possibly adjacent portions of the cap.

Use of the device is in fact self-explanatory since it mimics the design of a regular cap for the container.

In the following a preferred embodiment of the biocidal fluid purification cap for a fluid container of the invention will be described with reference to the attached drawing. In this drawing:

FIG. 1 shows a perspective view of an exemplary cap of the invention before and after mounting to a standard bottle as an example for a fluid container, FIG. 2 shows a cross-sectional view of the cap of FIG. 1, FIG. 3 shows an exploded perspective view of the cap of FIG. 2 in a partly dismounted arrangement, FIG. 4 shows a schematic representation of a detail of the UV-transparent window, of the LED(s) and of an adjacent reflecting portion of the cap, FIG. 5 shows a similar schematic representation as FIG. 4 of a modification of the cap including a fluid channel that allows introduction or extraction of fluid through the cap while the same is in place on a container, and FIG. 6 shows a diagram of the control functions integrated into the cap.

The biocidal fluid purification cap of the present invention has a cap body 3, formed in this example, from a lower part 4 and an upper part 5 accommodating the functional elements including the LED(s) and those for driving the LED(s) as well as supporting elements there between so that these elements are sealed from the environment. The lower part 4 of the cap body 3 includes an engagement feature 20 (see FIG. 2) for removably attaching the cap body to a mating engagement feature on an outer peripheral portion of a spout of a fluid container to hermetically close a spout opening. The engagement feature 20 may include a threaded/screw type or bayonet type of engagement structure or an elastic insertion engagement by frictional or form-locking engagement, for example in the form of a tight rubber or plastic seal arrangement. The engagement feature is preferably one of the common types or standard threads used in connection with the containers that are normally used for holding purified water serving as laboratory supply for cell culture or molecular biology. The container for this type of use preferably has a volume of less than 2 liters and is formed of PET, glass or plastics material including an UV resistant additive agent, in the form of a bottle, a flask or a bag, which can be rigid or semi-rigid or flexible overall except for the spout portion.

To facilitate handling like screwing/unscrewing of the cap the upper part of the cap body 3 and especially the upper part 5 but also the lower part 4 may include serrations or other forms of friction enhancing surface features 5a at external portions improving the grip of a user on the cap. Such a feature is schematically shown by the ribbed or knurled portion 5a in FIG. 3. This grip-portion may of course extend to other parts of the outer surface of the cap and the entire configuration of the cap is not restricted to the configuration shown in these figures.

Inside the cap body there is arranged at least one LED 7a adapted to emit light in the UV-C range, i.e. preferably in a light range in the wavelength of 220 nm-300 nm, preferably of 260 nm+/−5 nm. The light emitting layers of a suitable LED type are epitaxial crystal growth of AlGaN on different wafer substrates, for example. The power of the LED(s) will be selected based on the desired intensity of the UV-light in the stated range which will normally depend on the size and volume of the fluid container with which the cap is to be used. Suitable UV LEDs are commercially available, e.g. from Seoul Optodevice, reference number CUD8AF1A.

In the shown example, a plurality of LEDs are integrated on a printed circuit board (PCB) 7 to produce the desired power and to allow dimming or modulating of the power as well as a certain redundancy in case of failure of individual LED(s) as will be described further below.

The PCB 7 is preferably made with a metal base and is arranged in the cap body 3 so as to allow heat dissipation to the environment to the side that is remote or facing away from the side facing the interior of the container. Thus, the heat produced by the LED(s) can be more easily guided to the upper part of the cap body 3 and dissipated to the environment without substantial influence on the water in the container. In this case the friction enhancing feature 5a in the form of ribs etc. may additionally serve to increase the surface area to improve heat dissipation to the environment.

The cap also includes the necessary electronic circuitry 15 for driving the LED(s) and a power supply for the electronic circuitry. Such power supply may include single-use or rechargeable batteries (not shown) received in the cap body and/or a connector and/or a contact-less transmitting means to an external power source (not shown). The connector is preferably in the form of a USB-socket or plug in accordance with standard charging equipment that is also used in connection with PC-peripherals or mobile telephones. In that case, the electronic circuitry also may include a function for charging the battery by external power supplied through the connector or contact-less through induction.

The PCB 7 supporting the LED(s) 7a is mounted to the lower part of the cap body 4 by way of a holding bracket 8 that is attached by a number of screws 8a to bosses 8b protruding from the lower part 4 of the cap body 3. In the mounted position a sealing ring 12 and a UV-transparent window 6 is interposed between the receptacle in the lower part of the cap body 4 and the bracket 8. The UV-transparent window separates the LED(s) from the environment such that light emitted from the LED(s) may pass through the window 6 and enter the opening of the spout when the cap is attached to the spout of the container. The window is thus located above the engagement feature 20 as shown in FIG. 2. The sealing ring 12 is optionally provided to guarantee that no liquid may enter beyond the UV-transparent window.

The UV-transparent window is made from quartz or silica glass, for example. The space between the lower and upper parts of the cap body may further receive a switch 13 (see FIGS. 2 and 3) that is arranged so that it can detect removal of the cap from the spout of the container and can deactivate the operation of the LED(s) via suitable circuitry in response. This feature can protect the user from direct exposure to the UV-light of the LED(s) irradiated through the UV-transparent window when the cap is removed from the container and increases the lifetime of the batteries. For that purpose, the removal may be detected via the switch through a mechanical contact, i.e. in the form of a micro-switch lever, or contact-less by a suitable sensor replacing the mechanical switch.

The electronic circuitry 15 integrated into the cap may also include an interface and a function for receiving control signals from a remote device to program function settings of the circuitry and/or to read out or read-in operational parameters or other data. This exchange of control signals can be through a cable, the connector for the external power source and/or contactless through known technical means for contactless data exchange.

The electronic circuitry 15 in the cap may also include a function for modulating the drive power supplied to the LED(s) to allow dimming and/or intermittent operation of the LED(s) according to a predefined time and/or intensity schedule. The dimmed and/or intermittent operation is a means for managing the thermal dissipation of the LED(s) to avoid warming of the water in the container and may of course prolong the life-time of the battery. For example, the scheduled timing may be switched on at 100% of its power until the batteries are empty or may allow a pulsed operation of all or selected ones of the LED(s) for short increments of time or a continuous irradiation at a reduced power level. The desired irradiation pattern can be selected through a further switch integrated into the cap body and accessible to the outside or may be programmed through the above-described data interface. An LED dimming function may be implemented, for example, by pulse width modulation of the power signal to the LED(s) which has a variable duty cycle in order to decrease the average intensity of the UV irradiation. For example, a 10% duty cycle (10 ms on and 90 ms off) may maintain a constant minimal level of UV light energy blocking microorganism regrowth while not affecting dramatically the lifetime of the power supply. Likewise, a heat sensor or thermistor may be integrated in the circuitry to detect the temperature of the LED(s) and trigger a dimming function to extend the lifetime of the LED(s) that would be impaired by excessive heat and/or reduce the risk of microorganism growth and vapor deposition on the internal walls of the container.

The various functions of the circuitry can be integrated all on the PCB supporting the LED(s) or may be located at different modular PCBs received at various spaces within the cap body. An exemplary separate PCB bearing certain electronic circuitry is shown in FIG. 3 and is identified by the reference numeral 11. A general power or function switch 10 may be also integrated and accessible to the outside of the cap body. An example of the various circuit functions that might be integrated into the cap is shown in FIG. 6. In this diagram the control circuitry is summarized as "LED control module" and the external elements are shown as functional elements communicating therewith.

The cap body may include additional parts or covers that can be selectively removed, for example, to exchange batteries. Such an additional removable part is schematically represented by the lid 9 in FIG. 3 that is removably attached to the top side of the upper part of the cap body.

The lid 9 may also be transparent to receive information or handling instructions regarding the use of the cap or the content of the container. It may also allow hand-written indications on it regarding the date and time of the first opening, etc. or may incorporate a display (i.e. a small LCD) or other indicators communicating with the LED control module.

To increase the amount of light directed to the spout, the cap body 3 may be partially or completely made from a material that reflects UV-rays, for example, aluminum or PTFE or stainless steel, preferably at those portions upstream or downstream of the UV-transparent window 6 that are exposed to the light irradiation from the LED(s) 7a. Such UV-ray reflective structures 14 are schematically shown in FIG. 4 and they are arranged to direct the rays towards the spout opening. If necessary to avoid oxidizing of aluminum, for example, the material may be coated or covered with an oxidizing preventing layer of a UV-transparent material such as silica or quartz. The UV-reflecting material may also be applied in the form of a coating on other supporting material and restricted to those parts that are actually exposed to UV-radiation during use.

In order to signal operation of the UV-LED(s) to a user an additional light source in the visible range, for example, an LED irradiating light in the visible range, may be integrated on the PCB such that its light is at least partially visible from outside.

In another modification that is schematically shown in FIG. 5 a cap body 3 may include a fluid opening 16 communicating with or accessible to the outside of the cap body and a fluid opening 17 communicating with the spout opening of the container when the cap is attached to the spout as well as a fluid channel 18 extending between these fluid openings 16, 17 and passing between the UV-transparent window 6 and a further UV-transparent window 19 facing the opening of the spout to allow, in operation, the light emitted from the LED(s) to pass through the first UV-transparent window 6 and then through the fluid channel 18, before passing the second UV-transparent window 19 and entering the spout opening of the container. This modification allows introduction and/or extraction of fluid into/out from the container while the cap remains arranged on the spout, for example by way of a syringe or an inlet tubing coupled with the fluid opening 16. A seal or syringe connection including a check valve may be provided at the opening 16 to maintain the sterility of the interior of the container. An additional (not shown) vent filter may be included into the cap body if larger amounts of fluid are to be filled into the container through such a fluid channel. The structure may also be used to extract fluid from the container without removing the purification cap, for example by turning the container upside down in a position with the cap facing downward and extracting the fluid through a syringe coupled to the fluid opening 16 or valve. A suitable further seal arrangement may be provided at the fluid opening 17 to maintain the sterility of the interior of the cap and container.

The biocidal fluid purification cap for a fluid container of the invention provides a number of advantages which includes the possibility to irradiate small water volumes in standard containers and maintain their sterility over considerable time periods even after the container has been opened once. The wavelength of the UV-LED(s) is narrow and deep enough to be completely blocked by most plastics materials used for forming the containers. The integration of the LED(s) into the top portion of the cap allows secure heat dissipation to the environment involving warming of the water and microorganism growth promotion in the container. It also expands the lifetime of the LED(s). This aspect may be further improved by the dimming functions integrated into the circuitry of the purification cap for driving the LED(s). The power consumption of the common LED(s) in the wavelength is much lower than mercury-based solutions allowing for power consumption savings and extension of the use time. As compared to mercury-based purification concepts, there is less degradation of plastic from the tank and leaching of organic into the water and no risk of hazardous contamination.

The invention claimed is:

1. A biocidal fluid purification cap for a fluid container, including:
  a cap body including an engagement feature for removably attaching the cap body to a mating engagement feature on a spout of the fluid container to hermetically close a spout opening,
  at least one LED adapted to emit light in the UV-C range,
  electronic circuitry for driving said at least one LED, and
  a power supply for the electronic circuitry,
  wherein said at least one LED is arranged in said cap body so as to be separated from the environment by an UV-transparent window provided in the cap body such that light emitted from said at least one LED enters the opening of the spout when the cap is attached to the spout of the container, and wherein said cap body includes a switch that is adapted to detect removal of the cap body from the spout of the container and to deactivate the operation of the at least one LED via the electronic circuitry in response.

2. The biocidal fluid purification cap according to claim 1, wherein said power supply comprises a battery received in the cap body and/or a connector and/or a contact-less transmitting means to an external power source.

3. The biocidal fluid purification cap according to claim 2, wherein said electronic circuitry includes a function for charging said battery by external power supplied through said connector and/or said contact-less transmitting means.

4. The biocidal fluid purification cap according to claim 1, wherein said electronic circuitry includes an interface and function for receiving a control signal from a remote device to program function settings of the circuitry.

5. The biocidal fluid purification cap according to claim 1, wherein said electronic circuitry includes a function for modulating the drive power supplied to the at least one LED to allow dimming and/or intermittent operation of the at least one LED according to a predefined time and/or intensity schedule.

6. The biocidal fluid purification cap according to claim 1, wherein said electronic circuitry and said at least one LED are provided on a printed circuit board with a metal base, and said printed circuit board is arranged in the cap body to allow heat dissipation to the environment.

7. The biocidal fluid purification cap according to claim 1, wherein said at least one LED is adapted to emit light in the wavelength range of 220 nm-300 nm.

8. The biocidal fluid purification cap according to claim 1, wherein said cap body is at least partially made from or covered with a material that reflects UV-rays.

9. The biocidal fluid purification cap according to claim 1, wherein a portion of the cap body between the UV-transparent window and the spout opening is formed as a reflector for directing the light rays emitted from the at least one LED towards the spout opening.

10. The biocidal fluid purification cap according to claim 1, wherein said engagement feature for removably attaching the cap body to the spout of the container includes a threaded/screw or a bayonet-type or elastic insertion engagement structure.

11. The biocidal fluid purification cap according to claim 1, wherein said container is a bottle, flask or bag.

12. The biocidal fluid purification cap according to claim 11, wherein said bottle, flask or bag has a volume of less than 2 liters and is made of an UV-absorbent material.

13. The biocidal fluid purification cap of claim 11, wherein said bottle, flask or bag is made of a material selected from the group consisting of PET, glass and plastic.

14. The biocidal fluid purification cap of claim 13, wherein said material further comprises a UV-resistant additive agent.

15. The biocidal fluid purification cap according to claim 1, wherein said UV-transparent window is made from quartz glass or silica glass.

16. The biocidal fluid purification cap according to claim 1, wherein said at least one LED is adapted to emit light in the wavelength of 260 nm+/−5 nm.

17. The biocidal fluid purification cap according to claim 1, wherein said cap body is at least partially made from or covered with a material selected from the group consisting of aluminum, PTFE and stainless steel.

18. The biocidal fluid purification cap according to claim 1, wherein said cap body is covered with an oxidizing preventing layer of an UV-transparent material.

19. The biocidal fluid purification cap according to claim 1, wherein said cap body is covered with an oxidizing preventing layer at portions exposed to the light irradiation from the at least one LED.

* * * * *